United States Patent
Röhl et al.

(10) Patent No.: US 7,054,469 B2
(45) Date of Patent: May 30, 2006

(54) PASSIVATION LAYER STRUCTURE

(75) Inventors: Siegfried Röhl, Sauerlach (DE);
Paul-Werner Von Basse,
Wolfratshausen (DE); Thomas Scheiter,
Oberhaching (DE); Thorsten Sasse,
Munich (DE); Heinz Opolka,
Regensburg (DE)

(73) Assignee: Infineon Technologies AG, Munich (DE)

( * ) Notice: Subject to any disclaimer, the term of this patent is extended or adjusted under 35 U.S.C. 154(b) by 522 days.

(21) Appl. No.: 10/060,431

(22) Filed: Jan. 30, 2002

(65) Prior Publication Data

US 2002/0109209 A1    Aug. 15, 2002

Related U.S. Application Data

(63) Continuation of application No. PCT/DE00/02404, filed on Jul. 24, 2000.

(30) Foreign Application Priority Data

Jul. 30, 1999    (DE)    ................................ 199 35 910

(51) Int. Cl.
*G06K 9/00*    (2006.01)

(52) U.S. Cl. ...................................... 382/124; 257/626
(58) Field of Classification Search ........ 382/124–127; 361/56, 112; 257/623, 626, 48, 296; 250/208.1, 250/553; 356/71
See application file for complete search history.

(56) References Cited

U.S. PATENT DOCUMENTS

| 4,290,052 A | 9/1981 | Eichelberger et al. |
| 5,907,627 A | 5/1999 | Borza |
| 6,423,995 B1* | 7/2002 | Thomas ...................... 257/296 |

FOREIGN PATENT DOCUMENTS

| JP | 05 090 255 A | 4/1993 |
| JP | 08 148 485 A | 6/1996 |

* cited by examiner

*Primary Examiner*—Samir Ahmed
(74) *Attorney, Agent, or Firm*—Laurence A. Greenberg; Werner H. Stemer; Ralph E. Locher

(57) ABSTRACT

A conductor layer is patterned into flat portions, for example of a fingerprint sensor that effects capacitive measurement. The conductor layer is fragmented in a lattice-like manner by cutouts so that an applied passivation layer rests on a base layer that is present beneath the conductor layer. The interlaminar shear strength of the passivation is increased in this way.

6 Claims, 1 Drawing Sheet

PASSIVATION LAYER STRUCTURE

CROSS-REFERENCE TO RELATED APPLICATION

This application is a continuation of copending International Application PCT/DE00/02404, filed Jul. 24, 2000, which designated the United States.

BACKGROUND OF THE INVENTION

Field of the Invention

The present invention relates to a passivation layer structure for semiconductor components that is suitable, in particular, for sensors that effect capacitive measurement.

Semiconductor components that are exposed to environmental influences, and in particular, to mechanical wear require a particularly hard, scratch-resistant passivation. In fingerprint sensors, for example, the bearing area provided for resting a finger pad thereon is exposed to mechanical wear that significantly impairs the properties of the fingerprint sensor. In fingerprint sensors that operate according to the capacitive measurement method, it is important that the distance between a resting finger pad and the conductor planes in the semiconductor component of the sensor is kept constant within narrow tolerances, even after relatively long use of the sensor. Conventional passivation layers made of silicon oxide or silicon nitride, as are usually used in semiconductor technology, are not suitable in the case of relatively large loading on the surface of the components. Using thicker passivation layers or customary passivation materials such as polyimide, for example, is not suitable since thicker passivations reduce the sensitivity of the sensor.

SUMMARY OF THE INVENTION

It is accordingly an object of the invention to provide a passivation layer structure for semiconductor components which overcomes the above-mentioned disadvantages of the prior art apparatus of this general type.

In particular, it is an object of the invention to provide a passivation layer structure for semiconductor components that has a sufficient scratch resistance and that, in particular, can be used with sensors that effect capacitive measurement.

With the foregoing and other objects in view there is provided, in accordance with the invention, a passivation layer structure for sensors that effect a capacitive measurement. The passivation layer structure, includes: a base layer, a passivation layer, and a conductor layer configured between the base layer and the passivation layer. The conductor layer is patterned into portions extending in two dimensions. The portions of the conductor layer are formed with cutouts. The passivation layer extends through the cutouts to connect with the base layer.

In accordance with an added feature of the invention, the portions of the conductor layer are sensor arrays of a fingerprint sensor that effects capacitive measurement.

In accordance with an additional feature of the invention, the cutouts are configured in a lattice-like grid.

In accordance with a further feature of the invention, a metallization plane is formed with cutouts; a further layer is situated below the metallization plane and is connected to the metallization plane; and the base layer is applied on the metallization plane.

In accordance with a further added feature of the invention, the passivation layer is made of an oxide or a nitride; and the base layer is made of an oxide.

The invention is based on the insight that the scratch resistance of the passivation layers is improved with the shear strength. The passivation layer structure, which is formed from a patterned conductor layer (e.g. arrangement of the sensor areas of a sensor which effects capacitive measurement) and the passivation layers applied thereto, is patterned such that the conductor areas are fragmented in a lattice-like manner. In this way, the bottommost passivation layer rests through cutouts in the conductor layer on the layer situated beneath that.

Other features which are considered as characteristic for the invention are set forth in the appended claims.

Although the invention is illustrated and described herein as embodied in a passivation layer structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
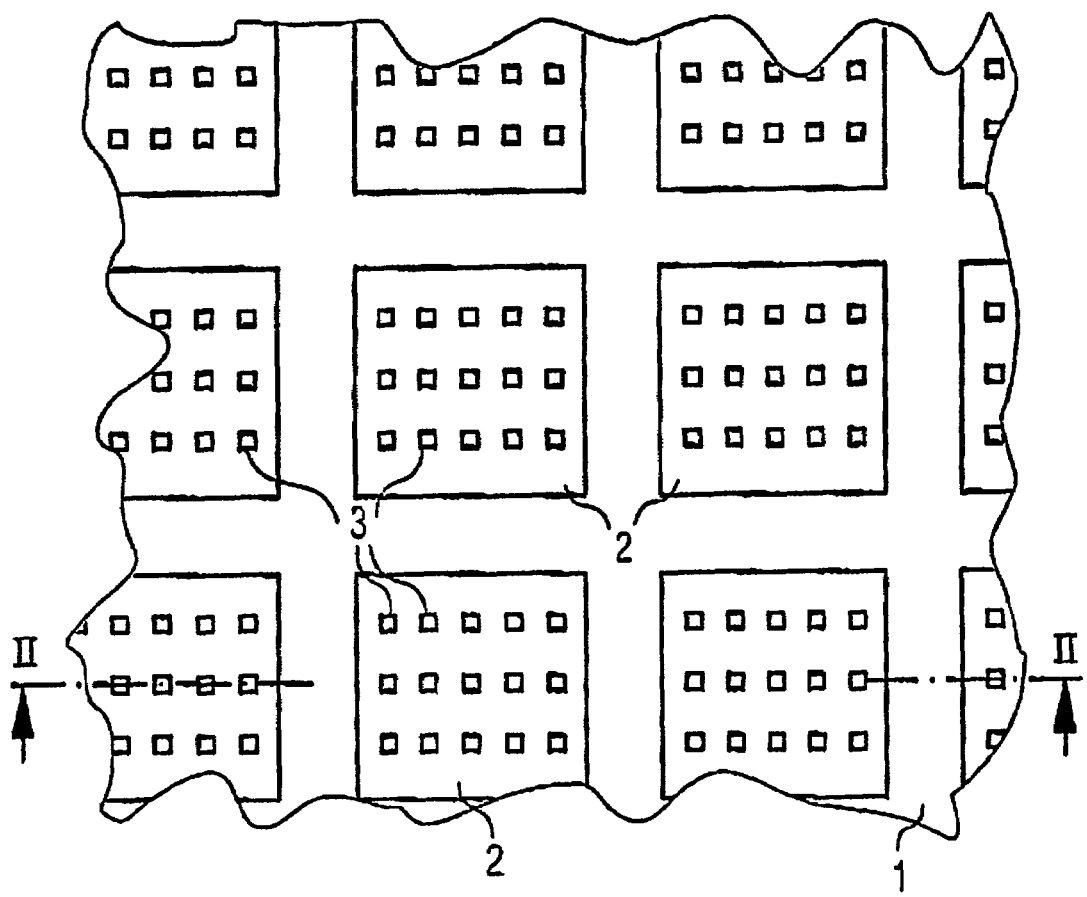
FIG. 1 shows a plan view of a semiconductor component.
Figure 2:
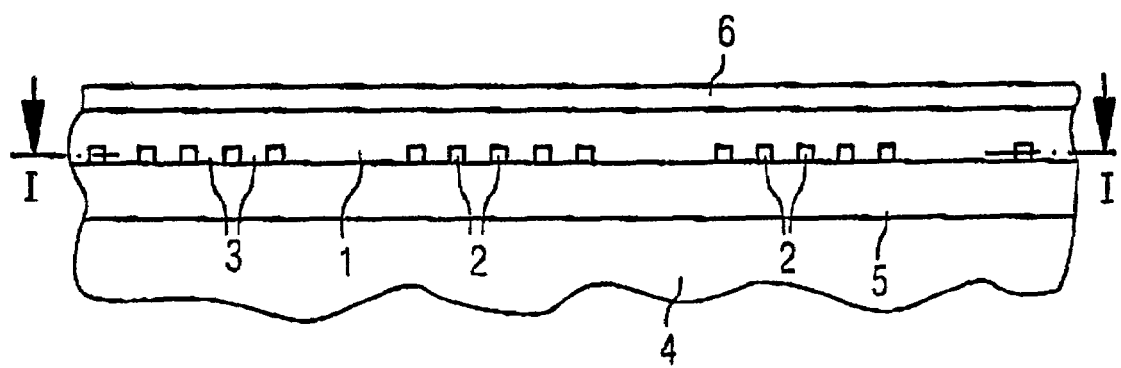
FIG. 2 shows a cross sectional view of the semiconductor component.

Referring now to the figures of the drawing in detail and first, particularly, to FIG. 1 thereof, there is shown a plan view of a plane of a semiconductor component. A conductor layer 2, which is patterned into a plurality of flat portions extending in two dimensions, is configured into the semiconductor component. The material of a passivation layer 1 is situated between these flat portions. The flat portions of the conductor layer 2 are provided with cutouts 3, which are filled with the material of the passivation layer 1. The associated layer construction is illustrated in the cross to section of FIG. 2, where it can be seen how the material of the passivation layer 1 fills the cutouts 3 of the flat portions of the conductor layer 2 and rests on a base layer 5 situated beneath that. The base layer 5 may be, for example, an electrically insulating layer that electrically insulates the conductor layer 2 toward the bottom. Situated below the base layer 5 there may be further patternings of the component, for example, a semiconductor substrate with a layer structure applied thereto. FIG. 2 diagrammatically depicts the lower portion of the semiconductor component 4 without patterning. At least one further passivation layer 6 may be applied on the top side of the passivation layer 1.

In the case of the passivation layer structure according to the invention, the interlaminar shear strength is increased by virtue of the fact that the flat portions of the patterned conductor layer 2 are fragmented by the cutouts 3, thereby forming a type of lattice or similar structure. In this way, it is possible, even in the region of the flat portions of the conductor layer 2, to connect the passivation layer 1 situated above the latter to the underlying base layer 5 (for example an oxide layer). The interlaminar shear strength can additionally be increased by the presence of a corresponding fragmentation also in a metallization plane below the base layer 5, so that the base layer 5 already has an improved shear strength.

Despite the reduced area contents of the conductor areas that are available for a capacitive measurement, the sensitivity of a sensor provided with a passivation layer structure according to the invention is equal to or better than a conventionally patterned, passivated sensor that effects capacitive measurement. This is because of the coupling-in of indirect stray capacitances at the side edges of the lattice.

In the exemplary embodiment illustrated in plan view in FIG. 1, the flat portions of the conductor layer 2 are, for example, the conductors that are each assigned to a pixel in a fingerprint sensor which effects capacitive measurement. The sensor areas are then square, for example, and have a side dimension of 40 to 50 µm. The cutouts 3, which in this example are arranged in three parallel rows each of five cutouts, may have a side dimension of 3 µm, for example.

We claim:

1. A passivation layer structure for sensors that effect a capacitive measurement, the passivation layer structure, comprising:
    a base layer;
    a passivation layer; and
    a conductor layer configured between said base layer and said passivation layer, said conductor layer being patterned into portions extending in two dimensions;
    said portions of said conductor layer being formed with cutouts inside said portions; and
    said passivation layer extending through said cutouts to connect with said base layer.

2. The passivation layer according to claim 1, wherein said portions of said conductor layer are sensor arrays of a fingerprint sensor that effects capacitive measurement.

3. The passivation layer structure according to claim 2, wherein said cutouts are configured in a lattice-like grid.

4. The passivation layer structure according to claim 1, wherein said cutouts are configured in a lattice-like grid.

5. The passivation layer structure according to claim 1, in combination with a metallization plane and a further layer, wherein:
    said metallization plane is formed with cutouts;
    said further layer is situated below said metallization plane and is connected to said metallization plane; and
    said base layer is applied on said metallization plane.

6. The passivation layer structure according to claim 1, wherein:
    said passivation layer is made of a material selected from the group consisting of an oxide and a nitride; and
    said base layer is made of an oxide.

* * * * *